United States Patent Office 3,375,218
Patented Mar. 26, 1968

3,375,218
NITROARYLSILANES AND SILOXANES
Donald L. Bailey, Snyder, N.Y., and Ronald M. Pike, Pelham, N.H., assignors to Union Carbide Corporation, a corporation of New York
No Drawing. Continuation-in-part of application Ser. No. 655,505, Apr. 29, 1957. This application Dec. 7, 1962, Ser. No. 242,934
5 Claims. (Cl. 260—37)

This invention relates to novel organosilicon compounds. More particularly, this invention is concerned with nitroarylhalosilanes, nitroarylhydrocarbonoxysilanes and nitroarylpolysiloxanes as new compositions of matter.

The nitroarylhalosilanes of this invention can be graphically represented by the following general formula:

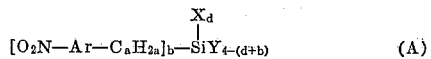

$$[O_2N-Ar-C_aH_{2a}]_b-\overset{X_d}{\underset{|}{Si}}Y_{4-(d+b)} \quad (A)$$

wherein Ar represents an arylene radical such as a phenylene radical, including a substituted phenylene radical; Y represents a halogen atom (such as fluorine, chlorine, or bromine); X represents an alkyl radical containing from 1 to 4 carbon atoms inclusive, $b$ is 1 or 2, $d$ is an integer having a value from 0 to 2 inclusive, and $(d+b)$ has a value from 1 to 3 inclusive. In Formula A, $a$ is an integer having a value of from 0 to 8 inclusive when $4-(d+b)$ is 1 or 2 and having a value from 2 to 8 inclusive when $4-(d+b)$ is 3. In the latter case, $b$ is one and $d$ is zero and Formula A becomes:

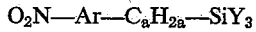

$$O_2N-Ar-C_aH_{2a}-SiY_3$$

Illustrative of substituents which may be attached to the phenylene radical are alkyl radicals (such as methyl, ethyl, propyl, etc.), alkoxy radicals (such as methoxy, ethoxy, etc.) carboxyl radicals, and the like.

The nitroarylhalosilanes of this invention can be produced by nitrating an arylhalosilane dissolved in a substantially anhydrous organic solvent. Such arylhalosilanes are represented by the following general formula:

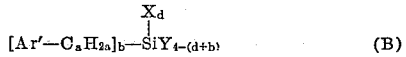

$$[Ar'-C_aH_{2a}]_b-\overset{X_d}{\underset{|}{Si}}Y_{4-(d+b)} \quad (B)$$

wherein Ar' represents a phenyl radical, or a linear or branched alkyl- or alkoxy-substituted phenyl radical such as chlorophenyl, tolyl and methoxyphenyl radicals; and X, $b$, Y, $a$ and $d$ have the same meanings as previously indicated. Illustrative of the arylhalosilanes represented by Formula B are beta-phenylethyltrichlorsilane, tolylmethyldichlorosilane, methoxyphenylmethyldichlorosilane, phenylmethydichlorosilane, phenyldimethylchlorosilane, phenylethyldichlorosilane, beta-phenylethyldimethylchlorosilane, chlorophenyldiphenylchlorosilane, beta-tolylethyltrichlorosilane, beta-phenylethylmethyldichlorosilane, and the like.

More specifically, the nitroarylhalosilanes of this invention can be produced by nitrating an arylhalosilane represented by Formula B at a temperature of from about −5° C. to about 30° C., preferably from about 5° C. to about 15° C. In the nitration the conventional nitrating agents are used, as for example, mixtures of nitric acid and sulfuric acid, or mixtures of potassium nitrate and sulfuric acid. Commercially available nitrating materials have been found suitable. The nitration is best carried out in a substantially anhydrous organic solvent which is a solvent for both the starting arylhalosilane and the nitroarylhalosilane produced. This solvent can be used as obtained commercially, even though it is known to contain small amounts of moisture. The preferred organic solvents are immiscible in sulfuric acid, and it is believed that this immiscibility aids in keeping the hydrolysis of the halogen-silicon bond to a minimum during the nitration reaction. Illustrative of the organic solvents which can be used are chloroform, acetic anhydride, carbon tetrachloride and the like.

The amount of nitrating agent which can be used in the above-described nitration is not critical, and can vary over a wide range. The amount charged can be varied from an equimolar amount of nitrating agent to arylhalosilane, up to about 3 moles of nitrating agent per mole of arylhalosilane. Larger quantities of nitrating agent are not recommended unless polynitro compounds are desired.

In one method of carrying out the above-described nitration reaction, the nitrating agent (for example, a mixture of nitric and sulfuric acids) is slowly added to a solution of the arylhalosilane dissolved in an organic solvent which is immiscible with sulfuric acid. In another method, the nitration can be carried out by the slow addition of nitric acid to a stirred and cooled two phase reaction mixture consisting of sulfuric acid and an organic solvent solution of an arylhalosilane, which is immiscible with sulfuric acid.

As a further illustration of the above-described nitration reaction, beta-(nitrophenyl)-ethyltrichlorosilane was produced by dissolving beta-phenylethyltrichlorosilane in chloroform and then slowly adding to the silane solution at a temperature of about 10° C., a mixed acid consisting of nitric and sulfuric acids. The beta-nitrophenyltrichlorosilane was then recovered by vacuum distillation.

The nitroarylhalosilanes of this invention can be esterified with hydroxyl-containing compounds (as for example, low molecular weight alcohols such as methanol, ethanol, propanol and butanol; or a phenol) to produce nitroarylalkoxysilanes or nitroarylaryloxysilanes, which can be depicted by the following general formula:

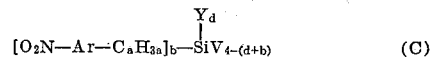

$$[O_2N-Ar-C_aH_{3a}]_b-\overset{Y_d}{\underset{|}{Si}}V_{4-(d+b)} \quad (C)$$

wherein Ar, X, $a$, $b$ and $d$ have the same meanings as hereinbefore indicated; and V represents an alkoxy radical containing from 1 to 6 carbon atoms inclusive, preferably from 1 to about 4 inclusive, or a phenoxy radical.

The above-mentioned esterification reaction can be carried out by dissolving the nitroarylhalosilane in an inert organic solvent (such as ether, chloroform or toluene) and then, while stirring, slowly adding the alcohol in a dropwise manner at about 0° to about 50° C., preferably at from about 20° C. to about 30° C., to the reaction mixture. The reaction can be illustrated by the following equation:

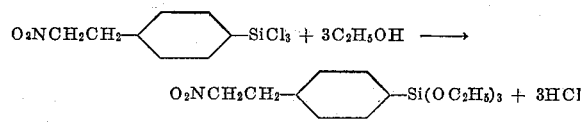

This equation illustrates a reaction in which all three halogen atoms are replaced by alkoxy groups. By proper equilibration it is possible to replace one, two or three of the halogen atoms present in the molecule and produce compounds containing both halogen and alkoxy or aryloxy functional groups. In the esterification, each halogen atom replaced liberates one mole of hydrohalic acid. This hydrohalic acid may be neutralized by the addition of an equivalent amount of an acid acceptor such as pyridine, or triethanolamine or ammonia before the nitroarylalkoxysilane is separated from the reaction mixture. When all of the halogen atoms are to be esterified, a large excess of the alcohol may be used, and it will act both as solvent and esterification agent.

The amount of alcohol or phenol required in the above-described esterification reaction is preferably at least one mole per halogen atom attached to the silicon atom of the nitroarylhalosilane which is to be replaced. If all of the halogen atoms are to be replaced, it is preferred to use an excess of alcohol in order to insure complete esterification. Illustrative of the nitroarylalkoxysilanes that can be obtained by the process of this invention are beta-(nitrophenyl)-ethyltriethoxysilane, nitrophenyltriphenoxysilane, nitrophenylmethyldiethoxysilane, beta - (nitrophenyl)-ethyldimethylethoxysilane and beta-(nitrotolyl)-ethyltriethoxysilane.

The nitroarylhalosilanes and the nitroarylhydrocarbonoxysilanes of this invention can be used to produce the polysiloxanes of this invention. By way of illustration, the trifunctional mono-nitroarylhydrocarbonoxysilanes and mono-nitroarylhalosilanes of this invention upon hydrolysis yield polysiloxanes containing units which can be represented by the following general formula:

$$[O_2N-Ar-C_aH_{2a}-Si-O_{3/2}] \quad (D)$$

where $a$ has a value from 2 to 8 inclusive and Ar has the above-defined meaning and the difunctional mono-nitroarylsilanes of this invention yield cyclic and linear polysiloxanes containing the unit represented by the following general formula:

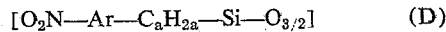

(E)

wherein $a$ has a value from 0 to 8 inclusive; X and Ar have the above-defined meaning and $b$ has a value of at least 3 and may be as high as 7 for the cyclic polysiloxanes and higher for the linear polysiloxanes; while the monofunctional mono-nitroarylsilanes of this invention yield disiloxanes having the structure:

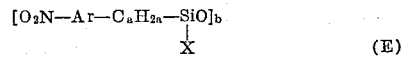

(F)

wherein Ar and X have the same meanings as previously indicated and has $a$ value from 0 to 8 inclusive. By admixing the silanes produced in this invention with other commonly employed functional silanes (such as tetraethylsilicate, dimethyldichlorosilane, ethyltrichlorosilane, phenylethyldichlorosilane, etc.) copolymers can be obtained by hydrolysis of the mixture. Such copolymers can contain from 1 to 99 mole-percent (preferably from 10 to 90 mole-percent) of nitroarylsiloxy units represented by the formula:

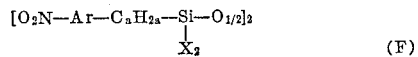

(1)

wherein Ar, $a$, $b$, X and $d$, have the above-defined meanings and from 1 to 99 mole-percent (preferably from 10 to 90 mole-percent) of hydrocarbylsiloxy units represented by the formula:

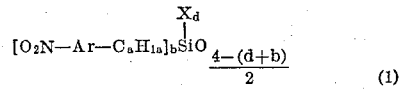

(2)

wherein R is a monovalent hydrocarbon group (e.g. an aryl, alkyl, alkaryl, aralkyl, alkenyl or alkynyl group) and $e$ has a value from 0 to 3 inclusive (preferably 1 or 2). Illustrative of the latter groups are the $SiO_2$, methylsiloxy, dimethylsiloxy, trimethylsiloxy, phenylsiloxy, beta-phenylethylsiloxy, phenylethylsiloxy $(C_6H_5SiC_2H_5O)$, vinylsiloxy, tolylsiloxy and diphenylsiloxy groups.

The nitroarylpolysiloxanes of this invention also include compounds composed solely of groups represented by Formula 1.

Polysiloxanes of this invention can also be produced by nitration of arylpolysiloxanes (such as phenylpolysiloxane, beta-phenylethylpolysiloxane or beta-tolylpropylpolysiloxane). The conditions for this nitration are the same as described above for the nitration of the arylhalosilanes.

The polysiloxane copolymers of this invention can be oils, resins or gums and can be prepared in several ways. The procedures include (1) cohydrolysis of the monomer components in solvent followed by condensation and/or equlibration with basic catalysts such as ammonium, sodium or potassium dimethylsilanolate or acidic catalysts such as sulfuric acid or trifluoroacetic acid, (2) the equilibration of mixtures of cyclic siloxanes with the basic or acidic catalysts just described and (3) the equilibration of certain highly reactive cyclic silicones by the basic catalysts just described at much lower than normal temperatures. Except for the last procedure, these processes are standard for the preparation of silicone oils, resins and gums. Polysiloxane copolymers of nitroarylsilicon compounds as illustrated in the general Formula 1 wherein $a$ is 0 can only be prepared when basic catalysts are used by the special procedures which are illustrated in some of the examples which follow. When $a$ is 2 or 3 in the general Formula 1 copolymerization can be carried out using standard procedures.

More specifically, the copolymers can be prepared, for example, by stirring at ambient temperature a mixture of nitrophenylmethylsiloxane with any desired amount of cyclic octamethyltetrasiloxane and a catalytic amount (e.g. 0.05 to 0.5 weight percent) of concentrated sulfuric acid until the mixture becomes homogeneous, followed by allowing the mixture to stand until the desired viscosity or hardness is obtained (e.g. 3 to 4 hours to produce gums). In such a procedure the acid catalyst is preferably washed from the copolymer before the copolymer is used, for example, in producing an elastomer. Base catalyzed polymerization of, for example, nitrophenyl mixed cyclic siloxane alone or with varying amounts of dimethylsiloxane cyclic trimer can be accomplished with 20 to 100 p.p.m. of potassium silanolate (e.g. $KO(Me_2SiO)_{10}K$) at ambient temperature.

In many cases the polysiloxane copolymers of this invention will consist of combinations of units, particularly with respect to the non-nitroarylsilicon portion of the copolymer.

Thus copolymer oils will be combinations of difunctional units with sufficient mono-functional endblocking units to provide the proper molecular weight, viscosity or other requirements. Examples of typical copolymer i.e. oils of this invention are represented by the following:

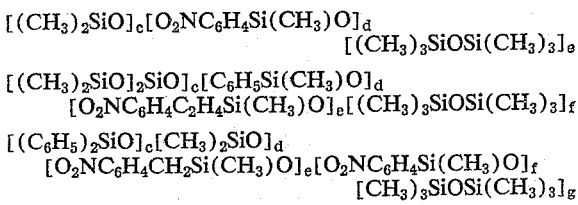

and the like, in which $c$, $d$, $e$, $f$ and $g$ are integers. Silicone oil compositions can also be prepared which contain trifunctional components. The copolymeric oils of this invention are useful as lubricants and hydraulic fluids.

Polysiloxane copolymer resins of this invention will contain suitable combinations of difunctional and trifunctional silicone units, and generally contain only minor amounts of, or frequently no, monofunctional endblocker component. The compositions will be determined by the properties desired of the resin, such as viscosity and the physical properties of the cured resin. Typical examples of resinous copolymers of this invention are the following:

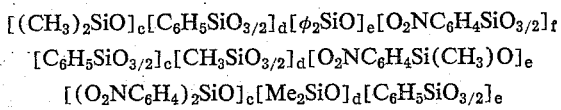

and the like in which $c$, $d$, $e$, and $f$ are integers. Such resins are useful as proective coatings for metals.

Polysiloxane copolymer gums of this invention consist of combinations of difunctional units with the absence of or with only the inclusion of only minor amounts of mono-functional or trifunctional units. Again the actual compositions will be determined by the properties desired for the gum or cured elastomer such as physical strength, solvent resistance and low-temperature flexibility. Typical copolymeric gums of this invention are exemplified by the following:

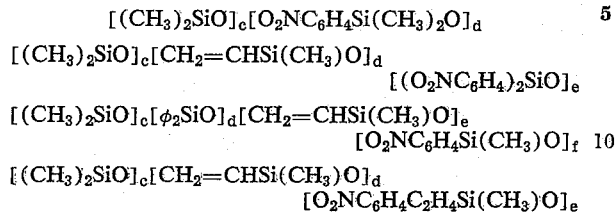

and the like in which $c$, $d$, $e$ and $f$ are integers. Alkenylsiloxane units, such as methylvinylsilane units

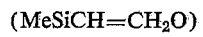

can be incorporated into the copolymer to enable curing with alkyl peroxides such as di-tert-butylperoxide and dicumyl peroxide. The amount of such alkenylsiloxane units is preferably from 0.3 to 3 mole percent of the siloxane groups in the gum.

A particularly useful variety of the nitroarylsilicon compounds of this invention are the nitroarylalkylsilicon compounds wherein the alkyl group is a linear group containing at least 2 successive carbon atoms. These compounds and those represented by Formulas A, C and 1 wherein the $—C_aH_{2a}—$ group is a group having the formula: $—(CH_2)_a—$ wherein $a$ has a value of from 2 to 8 inclusive. Such compounds include the beta-(nitrophenyl)-ethylsilicon compounds, gamma-(nitrophenyl)-propylsilicon compounds and delta-(nitrophenyl)-butylsilicon compounds of this invention.

Polysiloxane gums of this invention composed of only nitrophenylsiloxane units or both nitrophenylsiloxane units and dihydrocarbon-substituted siloxane units can be admixed with curing catalysts and fillers in appropriate proportions to provide silicone gum compounds of this invention that can be subsequently cured with the aid of the curing catalyst (preferably an organic peroxide) to provide highly desirable silicone elastomers. Suitable gums will vary in viscosity from materials (broadly termed silicone gums) which are slowly pourable to materials which will hardly flow at room temperature. In terms of molecular weight, these silicone gums will vary from about 200,000 up to 1,000,000 and above. In terms of hardness, these silicone gums will vary from about 30 to 150 (miniature penetrometer readings in tenths of a mm./10 sec.). The above ranges are probably the most useful although gums having viscosities outside these values can also be employed. The gums can contain from about 0.25 mole percent to 100 mole percent of nitrophenylsiloxane units although the preferred starting silicone gums are copolymers containing from about 5 to about 80 mole percent nitrophenylsiloxane units and from about 20 to 95 mole percent of dihydrocarbonsubstituted siloxane units.

The curable gum compounds of this invention usually contain a filler. The fillers that are useful include acidic fillers (such as uncoated finely divided silica), basic fillers (such as carbon black and alumina) and neutral fillers (such as diatomaceous earth, coated finely divided silica, calcium carbonate and quartz). These fillers impart desirable physical properties (e.g. high tensile strength) to the silicone elastomers produced from the curable gum compounds. The coated finely divided silicas that may be blended with the curable gum compounds of this invention include those coated silicas that contain alkoxy groups attached to the silicon atoms on the surface of the silica. The amount of the filler that may be used in the curable gum compounds of this invention is not narrowly critical and may range from 25 parts to 65 parts by weight of the filler per 100 parts by weight of the organopolysiloxane gum. Preferably from 35 parts to 45 parts by weight of the filler per 100 parts by weight of the gum are employed. In producing the curable gum compounds of this invention, it is often advantageous to preblend the filler and the organopolysiloxane gum and allow the mixture to bin age. This procedure promotes wetting of the filler by the gum.

Curable gum compounds of this invention containing no filler may be applied to fibrous materials and cured thereon to produce an elastomer. In such cases the elastomer has physical properties comparable to an elastomer produced from a curable gum compound containing a filler. Apparently the fibrous material functions as a filler.

Organic peroxides are useful in the curable gum compounds of this invention as curing agents. Included among such organic peroxides are alkyl peroxides, acyl peroxides, and alkyl-acyl peroxides. Useful alkyl peroxide curing agents are the dialkyl peroxides (such as di(tert-butyl) peroxide and dicumyl peroxide) and the alkyl hydroperoxides (such as tert-butyl hydroperoxide and cumene hydroperoxide). Useful acyl peroxide curing agents are the diacyl peroxides (such as benzoyl peroxide, p-chlorobenzoyl peroxide and 2,4-dichlorobenzoyl peroxide) and per acids or peroxy acids (such as peracetic acid and perbenzoic acid). Useful alkyl-acyl peroxide curing agents may be illustrated by such compounds as tert-butyl perbenzoate and tert-butyl peracetate. The type of organic substituent that is involved in the reaction that produces crosslinking during the cure of the starting gum determines to some extent which of the above-mentioned organic peroxide curing agents is most advantageously employed. Thus di(tert-butyl) peroxide is the preferred curing agent when the starting gum is cured by the reaction of silicon-bonded vinyl groups. Benzoyl peroxide is the preferred curing agent when the starting gum is cured by the reaction of silicon-bonded groups free of olefinic unsaturation.

The amount of the organic peroxide used as a curing agent in the curable gum compounds of this invention is not narrowly critical. In practice the amount of the curing agent may vary from 0.1 part by weight to 4 parts by weight of the peroxide per 100 parts by weight of the organopolysiloxane gum. When organopolysiloxane gums that cure through alkenyl groups are employed, the preferred amount of the peroxide curing agent is from 0.5 part to 1.0 part by weight per 100 parts by weight of the gum. When organopolysiloxane gums that cure through other groups are employed, the preferred amount of the peroxide curing agent is from 1.5 parts to 2.5 parts by weight per 100 parts by weight of the gum. Greater or lesser amounts of the peroxides may be used but no commensurate advantage is gained thereby.

The effectiveness of some of the peroxide curing agents that can be used in the curable gum compounds of this invention is impaired to some extent by certain fillers. By way of illustration, the effectiveness of benzoyl peroxide curing agents is somewhat impaired by carbonaceous fillers (such as carbon black) and so such fillers are preferably not employed when benzoyl peroxide is used as a curing agent. As a further illustration, the effectiveness of dicumyl peroxide as a curing agent is somewhat impaired when it is used in curable gum compounds containing silica (or other acidic fillers) as the sole filler. Hence, when dicumyl peroxide is employed as a curing agent neutral fillers, basic fillers or mixtures of acidic fillers and neutral or basic fillers are more desirable.

The curable gum compounds of this invention are cured by the application of heat. The gum compound may be heated by various known means, such as on a slab mold. The gum compound may be cured by heating to a temperature of from 110° C. to 200° C. The preferred curing temperature, when organopolysiloxane gums that cure through olefinically unsaturated hydrocarbon groups are used, is from 150° C. to 190° C. for five to 60 minutes. The preferred cure temperature for other gums is usually from 120° C. to 130° C. for 15 minutes. The gum compound may be maintained at the curing temperature for from 5 minutes to 30 minutes but preferably for from 15 minutes to 20 minutes. Heating the mixtures to other temperature for other periods of time may accomplish the cure of the gum compound, since the particular temperature and time used is not narrowly critical, but no particular advantage is gained by departing from the indicated temperature and time ranges. After curing, it is usually desirable to postcure the elastomer by heating it at 150° C. to 250° C. for about 24 hours.

Since the silicone elastomers produced from the nitroarylsiloxanes of this invention are characterized by improved solvent resistance together with the high retention of physical properties of elevated temperature, the elastomers are ideally suitable as electrical insulation materials.

The nitroarylhalosilanes, nitroarylalkoxysilanes, nitroarylaryloxysilanes and nitroarylpolysiloxanes of this invention can also be used to produce the corresponding amino compounds. For example, an ethanol solution of beta-(nitrophenyl)-ethyltriethoxysilane was catalytically reduced under a hydrogen pressure of about 35 p.s.i.g. in the presence of platinum oxide on carbon catalyst to produce beta-(aminophenyl)-ethyltriethoxysilane. These aminoarylsilicon compounds are then diazotized by conventional means to the diazonium salts which readily couple with phenols, naphthols, amines, etc. to produce valuable dyestuffs. For example, a red dyestuff was produced when the diazonium salt of beta-(aminophenyl)-ethyltriethoxysilane was coupled to beta-naphthal in an aqueous solution under alkaline conditions. This dyestuff was substantive to glass cloth from an aqueous dyebath, and was also substantive to other fibers.

The nitroarylsiloxanes of this invention, particularly the copolymeric and homopolymeric nitrophenylsiloxanes of this invention, possess outstanding oxidative stability and so are particularly adapted for use in the above-mentioned applications were elevated temperatures are encountered. The oxidative stability of these latter compounds is remarkably superior to the oxidative stability of known arylsiloxanes (e.g. phenylsiloxanes).

The nitroarylalkylsilicon compounds of this invention wherein the alkyl group contains at least two successive carbon atoms (e.g. the beta-(nitrophenyl)-ethylsilicon compounds of this invention) are, owing to their hydrolytic stability, particularly well suited for any of the above-mentioned applications where moisture or water is encountered. The hydrolytic stability of such compounds, especially in the presence of acids or bases, is remarkably superior to that of known arylsilicon compounds (e.g. phenylsilicon compounds).

The following examples (wherein "Me" denotes the methyl group) further serve to illustrate this invention:

Examples I to V illustrate the preparation of the nitroarylsilanes of this invention.

Example I

A 250 milliliter Pyrex three-necked flask was equipped with a stirrer, thermometer, dropping funnel and reflux condenser surmounted by a calcium chloride-containing drying tube. The flask was flushed with nitrogen and then 100 milliliters of anhydrous chloroform and 15 grams of beta-phenylethyltrichlorosilane were added. The mixture was stirred until the silane was completely dissolved, and it was then cooled in an ice bath to 10° C. Over a ¾ hour period at 8° to 12° C. and with vigorous stirring a mixture consisting of 10.7 milliliters of fuming nitric acid in 50 milliliters of 98% sulfuric acid was added to the flask. The reaction mixture was stirred another 5 minutes and then transferred under nitrogen to a separatory funnel. The bottom layer containing the inorganic acids was removed and the upper chloroform layer was dried over calcium chloride. The solution of beta-(nitrophenyl)ethyltrichlorosilane in chloroform was filtered under a protective atmosphere of dry nitrogen to remove desiccant. The filtrate was distilled under nitrogen at room temperature and under reduced pressure to remove the chloroform. A 10 gram distillate of beta-(nitrophenyl)ethyltrichlorosilane distilled over as a light yellow oil at a pressure of 3.2 millimeters of mercury at a temperature of 145° to 152° C.

*Microanalysis.*—Calcd. for $C_8H_8O_2NCl_3Si$: N, 4.9; Cl, 37.4. Found N, 4.7; Cl, 36.8.

Example II

In a 100 milliliter three-necked flask equipped as described in Example I there were charged, under a protective nitrogen atmosphere, 50 milliliters of anhydrous chloroform and 5 grams of beta-phenylethyltrichlorosilane. The mixture was stirred until the silane was completely dissolved and then cooled to 10° C. in an ice bath. Over a 10 minute period at 8° to 12° C. a solution consisting of 5 grams of potassium nitrate in 15 milliliters of 98% sulfuric acid was slowly added while stirring vigorously. The mixture was stirred an additional 15 minutes to allow it to come to room temperature, and then the mixture was transferred under a dry nitrogen atmosphere to a separatory funnel. The acid layer was removed and discarded. The chloroform layer was washed with 15 milliliters of 98% sulfuric acid, separated as above, dried over calcium chloride and then filtered under a dry nitrogen atmosphere to remove the desiccant. The filtrate was distilled at room temperature and under reduced pressure to remove the chloroform. An 0.4 gram distillate of beta-(nitrophenyl)-ethyltrichlorosilane distilled over at a pressure of 2.6 millimeters of mercury at a temperature of 141° to 144° C.

Example III

There were charged 100 milliliters of anhydrous chloroform and 21 grams of beta-phenylethylmethyldichlorosilane to a 500 milliliter flask equipped as described in Example I. The mixture so formed was stirred to dissolve the silane, cooled to 10° C., and the silane was nitrated and the product was isolated as described in Example I. There were obtained 12.8 grams of beta-(nitrophenyl)-ethylmethyldichlorosilane as a yellow oil at a pressure of 3 millimeters of mercury at a temperature of 154° to 162° C.

*Microanalysis.*—Calcd. for $C_9H_{11}O_2NCl_2Si$: N, 10.6; Si, 5.3. Found: N, 10.1; Si, 4.9.

Example IV

Dissolved 25 grams of phenylmethyldichlorosilane in 100 milliliters of anhydrous chloroform contained in a 250 milliliter Pyrex flask, which was equipped as described in Example I. The reaction mixture was cooled to 10° C. in an ice bath and over a ¾ hour period at 8° to 10° C., while stirring vigorously, a mixture of 10.7 milliliters of fuming nitric acid in 30 milliliters of 98% sulfuric acid was added in a dropwise manner. The mixture was stirred for an additional 10 minutes and then transferred to a separatory funnel. The acid layer was removed and discarded; dried the chloroform layer over calcium chloride, and then filtered to remove desiccant. The filtrate was distilled at room temperature under reduced pressure to remove the chloroform. The residue was fractionally distilled and there were recovered 10.4 grams of unreacted phenylmethyldichlorosilane at a pressure of 3 millimeters of mercury at 54° to 85° C. Then 2 grams of nitrophenylmethyldichlorosilane distilled over as a yellow oil at a pressure of 3.2 millimeters of mercury at 118° to 122° C. All operations were carried out under a protective atmosphere of dry nitrogen.

*Microanalysis.*—Calcd. for $C_7H_7O_2NCl_2Si$: Si, 11.9. Found: Si, 11.2.

Example V

There were charged 9.95 grams of beta-(nitrophenyl)-ethyltrichlorosilane and 30 milliliters of anhydrous ether to a 200 milliliter flask equipped as described in Example I. While stirring vigorously, there were added 3.98 milliliters of anhydrous ethanol in a dropwise manner at such a rate that a mild ether reflux was maintained. The mixture was stirred another 15 minutes and then the reaction flask was purged with dry nitrogen for 2 hours and a solution of 2.08 milliliters of anhydrous ethanol in 2.79 grams of anhydrous pyridine was added. A precipitate of pyridine hydrochloride instantly formed; stirred for about 15 minutes and then added another like portion of the ethanol-pyridine solution. After stirring for another 20 minutes filtered the slurry to remove the insoluble pyridine-hydrochloride. The ether was removed by distillation at room temperature under a partial vacuum and then the residue was fractionally distilled. There were obtained 7.5 grams of beta-(nitrophenyl)-ethyltriethoxysilane at a pressure of 0.45–0.55 millimeter of mercury at 143° to 152° C. This silane had a refractive index of 1.4885 at 25° C. All operations were carried out under a protective atmosphere of dry nitrogen. An analytical sample had a boiling point of 148° to 150° C. at a pressure of 0.45 to 0.55 millimeters of mercury and a refractive index of 1.4885 at 25° C.

*Microanalysis.*—Calcd. for $C_{14}H_{23}O_5NSi$: N, 4.48; Si, 8.95. Found: N, 4.8; Si, 8.2.

Example VI illustrates the preparation of nitroarylsiloxane homopolymers of this invention.

Example VI 10.1 grams of potassium nitrate were dissolved in 20 milliliters of 98% sulfuric acid contained in a 150 milliliter flask equipped as described in Example I and then 20 milliliters of anhydrous chloroform was added. While stirring at room temperature, 4.5 grams of a 70% by weight solution of beta-phenylethylpolysiloxane in anhydrous chloroform was added. After standing for about ½ hour the reaction mixture was poured onto 25 grams of crushed ice. The mother liquor was decanted from the tacky residue and discarded. The residue was then thoroughly washed first with water, then with ethanol and finally with ether. The beta-(nitrophenyl)-ethylpolysiloxane was dried overnight at room temperature on a clay plate. The light yellow polysiloxane powder weighed 4 grams; this represents a 99% yield based on beta-phenylethylpolysiloxane charged.

*Microanalysis.*—Calcd. for $C_8H_8O_{7/2}NSi$; N, 6.94. Found: N, 6.9.

Examples VII to XIV illustrate the preparation of nitroarylsiloxane copolymers of this invention.

Example VII

Fifty grams of diphenylsilicone cyclic tetramer were dissolved in a mixture of 400 milliliters of chloroform and 100 milliliters of acetic anhydride, and cooled to 0° C. with an ice bath. Over a one-half hour period 36.5 grams of 90% nitric acid were added while stirring vigorously. The mixture was stirred another 6 hours at 0° C. and then allowed to stand overnight without temperature control. Solvent and unreacted acid were removed under vacuum leaving a 50 gram reddish-brown solid residue. Nitrogen analysis (2.8±0.3%) indicated that one phenyl group in four was nitrated.

The nitration was repeated at other temperatures; all results are tabulated below:

| Run No. | A | B | C |
|---|---|---|---|
| Nitration Temperature, ° C. | 0 | 40–45 | 68–75 |
| Yield, grams | 49 | 52.5 | 46 |
| Percent Nitrogen in Product | 2.8 | 4.1 | 3.3 |

The nitrogen analysis of Run B indicated that about one-third of the phenyl groups were nitrated. Infra-red analysis showed the presence of the Si—O—Si cyclic tetramer structure and the presence of nitrophenyl groups.

Example VIII

Into 50-milliliter flask charge 13.5 grams of dimethylsiloxane cyclic trimer $[(Me_2SiO)_3]$, 10.0 grams of the cyclic tetramer, $[m-NO_2C_6H_4SiMeO][Me_2SiO]_3$, and 2 drops of 2.7 wt. percent potassium dimethyl silanolate. Under a nitrogen atmosphere the flask was placed in the 80° C. bath. In 15 minutes a hard, dry gum resulted.

Example IX

Into a 50-milliliter flask was charged 5.0 grams of $[m-NO_2C_6H_4SiMeO]_x$, 5.0 grams of dimethylsiloxane cyclic trimer $[(Me_2SiO)_3]$, and 10 milliliters of benzene. After 4 hours at 80° C. the two siloxanes were incompatible. The volume was brought up to 25 milliliters with benzene and 2 drops of 2.7 wt. percent potassium dimethyl silanolate (40–50 p.p.m.) was introduced. After 2 minutes, the mixture went completely compatible. Nitrogen was passed through the mixture to remove benzene at 80° and 7.5 grams of a stiff, dry, tough gum was produced.

Example X

Into a 1-liter resin kettle fitted with cover and vacuum fittings was charged 100 grams of the cyclic tetramer, $[m-NO_2C_6H_4SiMeO][Me_2SiO]_3$, and 7 drops of potassium dimethyl silanolate (40 p.p.m. potassium). The system was evacuated and the flask immersed in an 88° C. oil bath. In less than 2 minutes, immediate thickening was observed. In 30 minutes, a stiff, dry gum was produced.

Example XI

Into a 1-liter resin kettle with cover fitted for vacuum stripping was charged 70 grams of the cyclic tetramer $[NO_2C_6H_4SiMeO][Me_2SiO]_3$, and 0.35 gram 0.5 wt. percent of $H_2SO_4$ (conc.). The mixture was stirred at room temperature for 1 hr. until compatible. After standing 24 hours at room temperature, a very soft sticky gum was produced. Addition of more $H_2SO_4$, a total of 0.75 wt. percent and additional stirring gave a soft, bubble-free gum stock after 16 hours more at room temperature. After 24 more hours under vacuum, a firm gum resulted. Addition of 5 grams of $CaCO_3$ and 250 milliliters of benzene was made to neutralize the sulfuric acid. After filtration, water wash and vacuum stripping the product had reverted to a viscous fluid. Readdition of 1 wt. percent sulfuric acid produced a firm gum after 16 hours under vacuum.

Example XII

Into a 50-milliliter flask was charged 31.2 grams of the cyclic tetramer $[m-NO_2C_6H_4SiMeO][Me_2SiO]_3$, 3.8 grams of $Me_3SiO(Me_2SiO)_3SiMe_3$ and 0.175 gram 0.5 wt. percent $H_2SO_4$ (conc.). The mixture was shaken until clear and stood 68 hours at ambient temperature. Sulfuric acid was removed by repeatedly washing the ether-diluted oil, drying over $CaSO_4$, filtering with decolorizing charcoal and finally stripping to 150°C./0.5 min. The resulting clear, light-green oil was 22 mole percent $[m-NO_2C_6H_4SiMeO]$ modified 3500 molecular weight dimethylsiloxane oil.

Example XIII

After 21 hours at 63° C., 12.5 grams of $$[NO_2C_6H_4CH_2CH_2SiMeO][Me_2SiO]_3$$

containing 100 p.p.m. potassium as potassium dimethyl silanolate failed to produce polymer. At 150° C. 12.5 grams of the above containing 100 p.p.m. of potassium as potassium dimethyl silanolate gave a soft gum in 24 hours.

Example XIV

In a 500-milliliter three-necked round bottom flask fitted with a sealed stirrer, thermometer, addition funnel and reflux condenser was placed 77 grams (0.3 mole) of nitrophenyltrichlorosilane and 39 grams (0.3 mole)

of dimethyldichlorosilane dissolved in chloroform. The mixture was hydrolyzed with excess water, dried and then condensed by refluxing. A portion of the solution was desolvated to give a film which was insoluble in ether, benzene or ethyl acetate.

Examples XV and XVI illustrate the preparation of gums and elastomers of this invention.

*Example XV*

Into a 50 milliliter flask charge 13.5 grams of dimethylsiloxane cyclic trimer [(Me$_2$SiO)$_3$], 10.0 grams of the tetramer, [m-NO$_2$C$_6$H$_4$SiMeO][Me$_2$SiO]$_3$, and 2 drops of 2.7% potassium silanolate. The flask was placed in the 80° C. bath and nitrogen was bubbled through the mixture in the flask. In 15 minutes, a hard, dry gumstock resulted which was suitable for use in producing a silicone elastomer.

*Example XVI*

Into a 1-liter resin kettle fitted with cover and vacuum fittings were charged 100 grams of the tetramer,

[m-NO$_2$C$_6$H$_4$SiMeO][Me$_2$SiO]$_3$ and 7 drops of potassium dimethylsilanolate (40 p.p.m. potassium). The system was evacuated and the flask immersed in an 88° C. oil bath. In less than 2 minutes, immediate thickening was observed. In 30 minutes, a stiff,

PROPERTIES OF ELASTOMER PRODUCED FROM GUM*

|  | Hardness (Shore A) | Tensile, p.s.i. | Elongation, Percent | Tear, lb./in. | Volume Swell, Percent [1] | Loss, Percent |
|---|---|---|---|---|---|---|
| Mold Cure | 75 | 750 | 270 |  |  |  |
| 24 hr./480° F | 87 | 510 | 100 | 65 | [2] 96*** | 12 |
| 70 hr./480° F | 90 | 510 | 70 |  |  | 14 |
| 24 hr./480° F.[3] | 62 | 330 | 60 |  |  |  |

*Milled with 40 parts by weight of "M-5 Cab-O-Sil" (a commercially available finely divided silica filler) and 2 parts by weight of benzoyl peroxide per 100 parts by weight of the gum.
[1] In a mixture of isooctane and toluene.
[2] A conventional dimethylsilicone elastomer yields a "volume swell" value of 230% (i.e. its volume increased by 230% when immersed in a mixture of isooctane and toluene).
[3] After immersion in a mixture of isooctane and toluene.

dry gum was produced. Satisfactory physical properties at elevated temperatures, indicated above, were obtained by the mold-cured elastomer produced from the gum by employing conventional compounding and mold curing techniques.

This application is a continuation-in-part of application Ser. No. 655,505, filed Apr. 29, 1957.

What is claimed is:

1. Disiloxanes which are represented by the general graphic formula:

wherein Ar represents an arylene radical selected from the group consisting of a phenylene radical, an alkyl substituted phenylene radical and an alkoxy substituted phenylene radical; Y represents a member selected from the group consisting of alkyl radicals containing from 1 to about 4 carbon atoms; and $a$ is an integer having a value of from 0 to 8.

2. The nitroarylhalosilanes represented by the graphic formula:

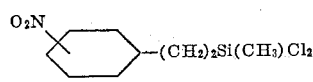

3. The nitroarylhalosilanes represented by the graphic formula:

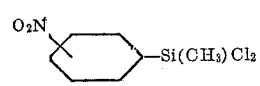

4. The nitroarylalkoxysilanes represented by the graphic formula:

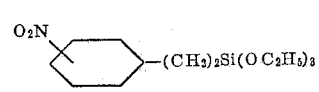

5. A curable gum compound comprising:
(1) a gum consisting essentially of from 1 to 99 mole percent nitroarylsiloxane groups represented by the formula:

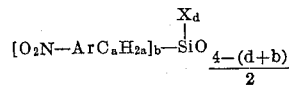

wherein Ar is a member selected from the group consisting of the unsubstituted phenylene radical, the alkyl-substituted phenylene radicals and the alkoxy-substituted phenylene radicals; X is an alkyl radical group containing from 1 to 4 carbon atoms inclusive; $a$ has a value from 0 to 8 inclusive; $b$ has a value from 1 to 2 inclusive; $d$ has a value from 0 to 1 inclusive; $(d+b)$ is two; and $4-(d+b)$ is two and from 1 to 99 mole percent hydrocarbonsiloxane groups represented by the formula:

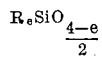

wherein R is a monovalent hydrocarbon group and $e$ has a value of 2;
(2) a curing agent for converting the gum compound to an elastomer; and
(3) a filler.

References Cited

UNITED STATES PATENTS

| 2,486,162 | 10/1949 | Hyde | 260—448.2 |
| 2,719,123 | 9/1955 | Merker | 260—448.2 |
| 3,020,302 | 2/1962 | Bailey et al. | 260—448.2 |
| 3,179,619 | 4/1965 | Brown | 260—46.5 |
| 2,985,680 | 5/1961 | Pepe | 260—448.2 |
| 2,756,246 | 7/1954 | Burkhard | 260—46.5 |
| 3,110,689 | 11/1963 | Smith | 260—37 |

FOREIGN PATENTS 1,114,641  4/1962  Germany.

OTHER REFERENCES

Yakubovich et al., Doklady Akad. Nauk, SSSR, vol. 99 (6), pp. 1015–1018 (1964) (translation available in 260—448.2).

"Silicones" (Fordham), published by George Newnes Ltd., 1960 pp. 195–198, copy in group 150.

R. A. Benkeser and P. E. Brumfield, JACS, 73, 4770, October 1951, pp. 4770–4773.

C. Eaborn, "Organosilicon Compounds," Academic Press Inc., N.Y. (1960), available in Scientific Library, pp. 454, 458, 461, 462.

Pierce, O. R., and G. W. Holbrook et al., Industrial and Engineering Chemistry, vol. 52, No. 9, September 1960, pp. 783–784. Copy available in Scientific Library.

JULIUS FROME, *Primary Examiner.*

MORRIS LIEBMAN, *Examiner.*

J. W. BEHRINGER, J. E. CALLAGHAN,
*Assistant Examiners.*